Patented Oct. 28, 1952

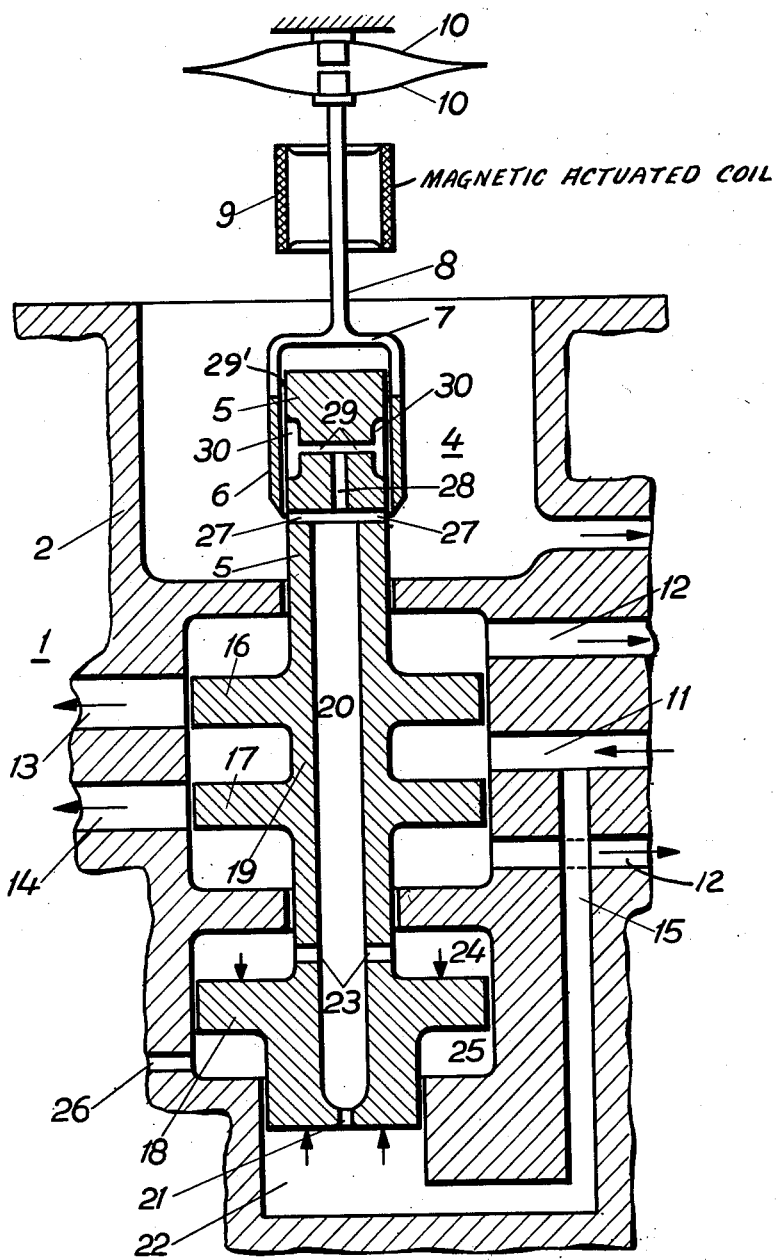

2,615,466

UNITED STATES PATENT OFFICE 2,615,466

BALANCED PILOT VALVE FOR HYDRAULIC MAIN VALVES

Aage Garde, Vasteras, Sweden, assignor to Allmanna Svenska Elektriska Aktiebolaget, Vasteras, Sweden, a Swedish corporation Application January 17, 1948, Serial No. 2,946
In Sweden September 10, 1942

Section 1, Public Law 690, August 8, 1946
Patent expires September 10, 1962

5 Claims. (Cl. 137—623)

It has been previously proposed to operate hydraulic and other pressure-controlling valves by means of an auxiliary valve connected with the piston of a main valve, and which auxiliary valve is considerably smaller than the main valve. This has the advantage that the force necessary for operating the valve system can be reduced to a small part of that necessary for a direct operation of the main valve. This is of the greatest importance, because a very sensitive regulator exerting a very small force can then be utilized for the control of a valve requiring a very large operating force.

The present invention has for its object to provide an improved arrangement of such a combined valve, and the characteristic feature thereof is that the auxiliary valve is entirely balanced and all friction is reduced to the purely liquid friction.

The arrangement according to the present invention concerns an improvement of a known arrangement in which the main regulating valve piston is connected with a pilot valve which consists of two concentric members of which one is provided with side-channels which are in communication with channels in the main piston or other source of fluid under pressure, whereas the other member, which is actuated by a valve controlling device, such as a regulator, at the movements of this control device throttles these channels to a greater or less degree according to the position of the said member. This throttling of the channels changes the pressure in, for example, the channels of the main piston, and this change of pressure is in the known manner utilized for the movement of the main piston, which in turn may control a valve for a pressure medium performing the regulating action.

According to the present invention, a direct contact between the two members of the pilot valve is prevented by an intervening liquid layer, which is held at a constant thickness as the members are held concentrically in relation to each other by means of liquid flowing outwards from auxiliary channels in one of the members. These channels are so arranged that the streams of liquid, flowing out sideways from the channels, act on the pilot valve member connected with the controlling regulator with forces counteracting each other and tending to maintain the concentric relation of the two members, because a displacement of one member in relation to the other causes a throttling of the auxiliary channels on one side, and thus an increase of the hydrostatic pressure on this side and a corresponding decrease on the other side, so that a force occurs counteracting the eccentricity of the members. In the accompanying drawing, a form of the invention is shown applied on a hydraulic valve controlled by an electric regulator.

The drawing shows the arrangement in cross-section. In the drawing, 1 designates the main valve, which consists of a valve housing 2 and the main piston 18. 4 is the auxiliary valve which consists of two members 5 and 6, of which the outer member 6 is connected by means of arms 7 and a rod 8 with the movable member of the controlling regulator, which is represented only by its moving coil 9 and its spring system 10.

In the housing 2 of the main piston 18 there is also a fluid controlling valve consisting of two pistons 16 and 17 coacting with a number of channels, 11, 12, 13, and 14. The fluid, which may be oil or water under pressure and may serve, for example for operating a servo-motor, is delivered to the valve housing 2 through the port 11 from a pump not shown in the drawing. The three pistons 16, 17, and 18 are all connected with a central pipe 19. The piston 18 has for its purpose to move the other pistons in the manner hereinafter desscribed. The pilot valve consists of the cylindrical member 5 joined with the central pipe 19 and of a sleeve or outer part 6 surrounding the member 5. The central channel 20 of the pipe 19 is at its lower end in communication, through a restricted port 21, with a space 22 in the housing 2, and is in communication by side channels 23 with a space 24, also in the housing 2. A space 25 in the housing 2 communicates through a channel 26 with the space outside of the valve cylinder. At its upper end the channel 20 communicates by side channels 27 with the space outside the valve, and these channels 27 serve for controlling the main piston 18 in the manner hereinafter described. The channel 20 also communicates by a channel 28 and diametrically opposed radial side channels 29 with the gap 29' between the two members 5 and 6 of the pilot valve. The radial channels 29 are at their outer extremities enlarged to form grooves or recesses 30, in which the flow of fluid from said channels is retarded, and due to the speed reduction of the fluid the pressure is increased, speed energy being converted to pressure energy.

The arrangement acts in the following way:

The pressure medium from the pump is delivered through the channels 11 and 15 to the space 22 and from this space through the restricted port 21 to the channel 20. As long as the channels 27 are uncovered, the pressure medium freely flows out therethrough and acts on the lower end of the main valve in the space 22 with a pressure which, due to the restriction 21, is higher than the pressure in the channel 20 and also higher than the pressure in the space 24, which pressure, as long as the channels 27 are open, will be almost equal to the pressure outside of the valve. When the channels 27 are throttled by the sleeve 6, the pressure in the channel 20 and then in the space 24 will be increased up to a value practically equal to the pressure in the space 22. The pressure acting on the upper side of the piston 18 will then provide a force acting downwards and counteracting the force acting upwards on the lower end of the main valve in the space 22. The effective area of the main valve end in the space 22 is, however, only half as large as the effective area of the piston 18 in the space 24, so that when the channels 27 are throttled and the pressure in the space 22 is equal to that of the channel 20, the piston will move downwards.

The main object of the present invention is the centralization of the sleeve 6, which is effected by means of the radial side channels 29 in the member 5, because through these channels a quantity of liquid always escapes, the magnitude of this quantity being dependent on the one hand on the pressure in the channel 20 and on the other hand on the width of the gap between the members 5 and 6. If, for any reason, the sleeve 6 be moved sidewise, so that the gap at one side becomes smaller, the flow from the side channels 29 on this side will be throttled so that the hydrostatic pressure in the enlarged parts 30 at this side will increase, which increase counteracts the motion of the sleeve 6, in spite of the fact that the sleeve 6 is freely movable sideways. By this arrangement, it is ensured that no direct contact between the sleeve 6 and the member 5 can occur, and the friction between the two members 5, 6 is therefore limited to the purely liquid friction in the gap between them. The liquid friction will thus be very low and the sensitivity will be the highest possible. The enlarged parts 30 of the channels 29 are provided in order to decrease the influence of the velocity of the liquid. The sleeve 6 is connected by means of the arms 7 and the rod 8 with the coil 9 of the regulator and is, together with it, suspended from the spring system 10, which suitably consists of two crosses of thin spring-metal sheets. The suspension can, of course, also be made in some other suitable manner.

When the main piston 18 moves up and down due to the action of the controlling regulator 9, 10 and pilot valve 4, the pressure fluid delivered to the main valve through the port 11 is directed either to the pipe line 13 or 14 due to the position of the pistons 16 and 17. These pipes 13, 14 may lead to the two sides of a servo-motor piston not shown on the drawing. The ports 12 serve only for evacuating the spaces above piston 16 and below piston 17. For evacuating the space below the piston 18, the passage 26 is provided.

In spite of the fact that the embodiment illustrated and described contains a fluid controlling valve, the device may of course also be used in combination with a valve arranged remote from the main piston and also the main piston may control some other device mechanically connected therewith.

I claim as my invention:

1. A regulating device comprising a cylinder fed with a fluid under pressure, a regulating piston movable therein, and a pilot valve mechanism connected with said regulating piston and comprising two relatively movable concentric members with a liquid space therebetween, a regulating device actuating one of said members, radial channels formed in the other of said members and communicating with a source of fluid under pressure, at least one of said radial channels being arranged to be closed by the first member when moving, and at least two of said radial channels terminating in the space between the two concentric members and being symmetrically arranged with respect to each other so that the fluid passing therefrom maintains said members in concentric relation to each other.

2. A regulating device comprising a cylinder fed with a fluid under pressure, a regulating piston movable therein, a channel in said piston, and a pilot valve mechanically connected with said regulating piston and comprising two relatively movable concentric members having a liquid space therebetween, a regulating device actuating one of said members, and radial channels formed in the other of said members and communicating with the said channel in the regulating piston, at least one of said radial channels being arranged to be closed by movement of the first member, and at least two of said radial channels being arranged in balanced relation to each other and terminating in the space between the two members to maintain such members in concentric relationship with each other.

3. A regulating device comprising a cylinder, a regulating piston movable therein, a pilot valve mechanically connected with said piston, said pilot valve comprising two relatively movable concentric members having a liquid space therebetween, a regulating device actuating one of said members, radial channels formed in the other of said members and communicating with a source of fluid under pressure, at least one of said radial channels being arranged to be closed by movement of the first member and at least two of said radial channels terminating in the liquid space between said members, the latter channels having at their outer extremities enlarged cross-sectional areas communicating with said liquid space and said areas being disposed in symmetrical relationship with each other.

4. A regulating device comprising a regulating piston movable in a cylinder fed with a fluid under pressure, a pilot valve mechanically connected with said regulating piston, said pilot valve comprising two relatively movable concentric members having a liquid space therebetween, a regulating device operating one of said members, radial channels so arranged as to be closed by the first member when moving, radial channels terminating in the space between the two members, the latter channels being opposed to each other and having enlarged areas adjacent to said liquid space, and a valve connected with said regulating piston for the control of a servo-motor actuating fluid.

5. A regulating device having a cylinder fed with a fluid under pressure and a regulating piston movable therein, a pilot valve mechanically connected with said regulating piston and comprising two relatively displaceable concentric members with a restricted annular fluid space therebetween, a regulating device actuating one of said members relatively to the other, a channel in the other member in communication with a source of fluid under pressure, a radial port leading from said channel and arranged to be covered and uncovered by the first member when said members are displaced relatively to each other, and additional ports arranged in balanced relationship with each other and providing communication between said channel and the said restricted fluid space to maintain a supply of fluid in said space and to exert fluid pressure between adjacent surfaces of said members to maintain such members in concentric relation to each other.

AAGE GARDE.

REFERENCES CITED

The following references are of record in the file of this patent:

UNITED STATES PATENTS

| Number | Name | Date |
|---|---|---|
| 552,202 | Scott | Dec. 31, 1895 |
| 2,391,531 | Warrne | Dec. 25, 1945 |

FOREIGN PATENTS

| Number | Country | Date |
|---|---|---|
| 18,559 | Switzerland | Feb. 9, 1899 |